United States Patent
Danielsson

(10) Patent No.: US 6,363,810 B2
(45) Date of Patent: Apr. 2, 2002

(54) ARRANGEMENT FOR A STEERING MECHANISM

(76) Inventor: Daniel Danielsson, Unbyn 311, S-961 93 Boden (SE)

( * ) Notice: Subject to any disclaimer, the term of this patent is extended or adjusted under 35 U.S.C. 154(b) by 0 days.

(21) Appl. No.: 09/681,724

(22) Filed: May 26, 2001

Related U.S. Application Data

(63) Continuation of application No. PCT/SE99/02110, filed on Nov. 18, 1999.

(51) Int. Cl.⁷ ................................................. B62D 1/18
(52) U.S. Cl. ........................................ 74/493; 280/775
(58) Field of Search ............................ 74/493; 280/775

(56) References Cited

U.S. PATENT DOCUMENTS

| | | | |
|---|---|---|---|
| 4,507,982 A | * 4/1985 | Turner et al. | 74/493 |
| 4,607,540 A | * 8/1986 | Kinoshita et al. | 74/493 |
| 4,750,379 A | * 6/1988 | Nishikawa et al. | 74/493 |
| 4,788,880 A | * 12/1988 | Kester | 74/493 |
| 4,876,910 A | * 10/1989 | Nikhikawa et al. | 74/493 |
| 5,606,891 A | 3/1997 | Tisell et al. | |
| 6,095,012 A | * 8/2000 | Lutz | 74/493 |

FOREIGN PATENT DOCUMENTS

| | | | |
|---|---|---|---|
| JP | 61-21860 | * | 1/1986 |
| SE | 449329 | | 4/1987 |

* cited by examiner

Primary Examiner—David A. Bucci
Assistant Examiner—William C Joyce
(74) Attorney, Agent, or Firm—Kilpatrick Stockton LLP

(57) ABSTRACT

Adjustable steering arrangement for a driver of a vehicle having an inner steering wheel shaft adapted to be connected to a steering wheel of the vehicle. The inner steering wheel shaft being arranged to be vertically adjustable and with respect to distance from the driver. A first lock arrangement is configured to fix the inner steering wheel shaft in a chosen position with respect to vertical and distance from the driver and a second lock arrangement is configured to fix the steering wheel in at least two distinct vertical positions independent of any locking of the first lock arrangement. The first lock arrangement is supported on a locking spindle extending substantially transverse to a longitudinal direction of the inner steering wheel shaft and is connected to the inner steering wheel shaft. The second lock arrangement has a rotatable tilting spindle that extends coaxially through the locking spindle.

16 Claims, 2 Drawing Sheets

ARRANGEMENT FOR A STEERING MECHANISM

CROSS REFERENCE TO RELATED APPLICATIONS

This is a continuation patent application of International Application Number PCT/SE99/02110 filed Nov. 18, 1999 that designates the United States. The full disclosure of said application, in its entirety, is hereby expressly incorporated by reference into the present application.

BACKGROUND OF INVENTION

1. Technical Field

The present invention relates to a vehicular steering mechanism arrangement. The invention is intended in particular to be used in connection with steering mechanisms for motor vehicles which are designed with an integrated adjusting and tilting function.

2. Prior Art

In vehicles such as passenger cars, a steering mechanism is normally used that includes a steering wheel and a steering wheel shaft that together enable steering of the vehicle. For reasons of comfort and safety, the steering mechanisms in use today are often designed to permit adjustment of the position of the steering wheel shaft, and thus also of the steering wheel, with respect to height and depth in relation to the driver of the vehicle. In this way, the steering wheel can be adjusted and then locked in a position that is individually adapted to the vehicle driver.

The abovementioned adjusting function can additionally be combined with what is commonly referred to as a tilting function. This means that the steering mechanism is additionally designed so that the steering wheel can be displaced between two distinct positions. These positions include a lower end position that corresponds to normal driving, and an upper end position in which the steering wheel is raised slightly in the vertical direction and which is used when the vehicle driver is getting into or out of the vehicle. This function is preferably made automatic and is provided primarily for reasons of comfort since it is easier for the driver to get into and out of the vehicle when the steering wheel is moved slightly away from the position it is in during driving. The tilting function can preferably be activated by means of an electric switch, for example in the door on the driver's side of the vehicle, that is connected to a computerized control unit. In this way, a signal can be generated, for example when the driver opens the door, so that the tilting function is activated and the steering wheel is moved upwards to the upper end position as the driver is getting into the vehicle and sitting down in the driver's seat. This provides increased comfort for the driver.

In previously known combined adjusting and tilting arrangements for steering mechanisms, it has been sought to arrange the mechanism in such a way that the system maintains an adjusted and locked position even while the tilting function is activated. In this way the steering wheel setting which is used when driving the vehicle is maintained as regards height and depth after the driver has climbed into the vehicle and the adjustment functions have been activated.

A further problem in known systems having combined adjusting and tilting functions is that these systems are relatively complicated in structure and include a relatively large number of components which, taken together, contribute to high production costs and increase the weight of the vehicle.

In addition, previously known systems of this type require a relatively large construction volume, which of course encroaches on the already very confined space around the steering mechanism in the vehicle.

SUMMARY OF INVENTION

An object of the present invention is to provide an improved arrangement for steering mechanisms having adjusting and tilting functions which avoid the problems outlined above. In particular, the invention aims to make it possible for an adjusted position of the steering wheel to be maintained with respect to height and depth, even after the tilting function has been activated.

The invention provides an arrangement that is intended to be used in an adjustable steering mechanism in a vehicle. The arrangement includes a steering wheel that is fixed to an inner steering wheel shaft, which in turn is arranged to be adjustable with respect to height and depth. The invention has a first lock arrangement intended to fix the inner steering wheel shaft in a chosen position with respect to height and depth, and a second lock arrangement that is intended to set the steering wheel in at least two distinct vertical positions independently of any locking of the first lock arrangement.

The first lock arrangement is supported on a locking spindle extending essentially transverse to the longitudinal direction of the inner steering wheel shaft and is connected to the inner steering wheel shaft. The second lock arrangement includes a rotatable tilting spindle extending coaxially through the locking spindle. The invention affords the important advantage that the steering wheel can be tilted between the distinct positions while a position set by means of the first lock arrangement is maintained.

The fact that the tilting spindle and the locking spindle are arranged concentrically in relation to each other means that the arrangement occupies only a very small space or construction volume in the area of a steering mechanism. A further advantage of the invention is that it has a relatively small number of components and can thus be manufactured at relatively low weight, volume and cost.

BRIEF DESCRIPTION OF DRAWINGS

The invention will be explained in greater detail below with reference to a preferred illustrative embodiment and to the attached drawings, in which.

DETAILED DESCRIPTION

Figure 1:
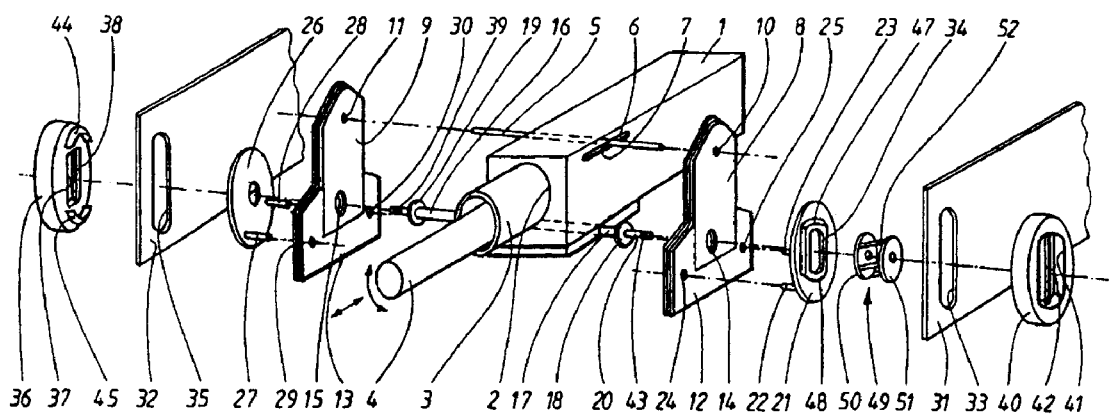
FIG. 1 shows an exploded perspective view of the invention, seen obliquely from one side, in an exploded state.

An arrangement according, to the present invention is shown diagrammatically in FIG. 1. According to a preferred embodiment, the arrangement is used to provide an integrated adjusting and tilting function in connection with a steering mechanism for a motor vehicle, for example, a passenger car. FIG. 1 shows the invention in a perspective view, obliquely from the front, in an exploded state.

According to the illustrated embodiment, the invention includes an outer steering wheel shaft 1 which consists of an essentially elongate, box-shaped element of preferably rectangular cross section. The outer steering wheel shaft 1 extends essentially in the longitudinal direction of the carrying vehicle and is designed with a longitudinal opening 2 which forms a continuous hole or channel. An adjusting tube 3 is arranged in the opening 2, more precisely extending coaxially in relation to the outer steering wheel shaft 1. The adjusting tube 3 is in turn intended to support an inner steering wheel shaft 4. The vehicle's steering wheel, which is not shown, is arranged on the end portion of the inner steering wheel shaft 4 projecting from the adjusting tube 3. The inner steering wheel shaft 4 is preferably mounted in radial bearings in the adjusting tube 3. This permits rotation of the inner steering wheel shaft 4 inside the adjusting tube 3.

A transverse spindle 5 in the form of an articulation spindle runs transversely through the upper portion of the outer steering wheel shaft 1. For this purpose, the outer steering wheel shaft 1 is designed on each side with longitudinal openings in the form of a first slot 6 and a second slot through which the articulation spindle 5 extends. The adjusting tube 3, which runs inside the outer steering wheel shaft 1, is also designed with a first hole 7 and a second hole through which the articulation spindle 5 extends. Only the first slot 6 and the first hole 7 can be seen in FIG. 1. The two slots have a predetermined extent in essentially the same direction as the longitudinal direction of the outer steering wheel shaft 1. In this way, the adjusting tube 3, together with the inner steering wheel shaft 4, can be displaced a corresponding distance in relation to the outer steering wheel shaft 1. When the adjusting tube 3 is displaced in the longitudinal direction inside the outer steering wheel shaft 1 together with the articulation spindle 5, the latter thus comes to be displaced along the abovementioned slots.

According to what is shown by arrows in FIG. 1, the inner steering wheel shaft 4, together with the vehicle's steering wheel can thus be displaced with respect to depth, which is measured essentially in the longitudinal direction of the vehicle, and can also be pivoted upwards or downwards. The latter pivoting movement is made possible by the fact that the outer steering wheel shaft 1 is pivotably suspended in the vehicle. This suspension is of a known type and therefore is not shown in detail.

The respective end portions of the articulation spindle 5 are intended to be arranged extending through a first plate stack 8 and a second plate stack 9. Each plate stack 8, 9 consists of a number of plates, preferably about 5 to 10 in number, in the upper parts of which there are through-holes 10 and 11, respectively. These holes 10, 11 are intended to receive the respective end portions of the articulation spindle 5. The articulation spindle 5 thus functions as a point of attachment and an axis of rotation for the first plate stack 8 and the second plate stack 9.

The plates constituting the first plate stack 8 protrude into and cooperate with a further corresponding set of plates which together constitute a third plate stack 12. Correspondingly, the plates constituting the second plate stack 9 protrude into a further set of plates which together constitute a fourth plate stack 13. Further, holes 14 are formed through both the first plate stack 8 and the third plate stack 12. Correspondingly, further holes 15 are formed through the second plate stack 9 and the fourth plate stack 13.

The lower part of the outer steering wheel shaft 1 supports a tubular element in the form of a locking spindle 16. For this purpose, a hole 17 is formed extending transversely through the lower part of the outer steering wheel shaft 1, which hole 17 is indicated by broken lines in the figure. As will be explained in detail below, the locking spindle 16 is used for locking the steering wheel in a desired position; that is, a desired position as regards height and depth of the inner steering wheel shaft 4. For mounting the locking spindle 16 through the hole 17, the locking spindle 16 has an external diameter slightly smaller than the internal diameter of the hole 17.

Each end portion of the locking spindle 16 has a disc-like or flange-like section of greater diameter than the rest of the locking spindle 16. These sections in this way form a first limit stop 18 and a second limit stop 19. The first limit stop 18 is preferably designed such that it is integral with the rest of the locking spindle 16, whereas the second limit stop 19 consists of a separate part which is preferably threaded securely onto the opposite end portion of the locking spindle 16 in connection with the locking spindle 16 being mounted through the outer steering wheel shaft 1.

When the arrangement is in its assembled state, the locking spindle 16 is intended to constitute an axis of rotation and point of attachment for all the plate stacks 8, 9, 12 and 13 by means of the fact that each end portion of the locking spindle 16 is intended to run through the holes 14 and 15 formed in the plate stacks 8, 12 and plate stacks 9, 13, respectively. These sets of holes 14, 15 are additionally elongate in shape so that the locking spindle 16 can be displaced in essentially the vertical direction along these holes 14, 15. When the arrangement is in its assembled state and the adjusting tube 3 is displaced along the outer steering wheel shaft 1, the articulation spindle 5 also comes to be displaced in relation to the outer steering wheel shaft 1 This means that the first plate stack 8 and the second plate stack 9 are turned slightly in relation to the third plate stack 12 and fourth plate stack 13, respectively. Thus, during this turning movement, the locking spindle 16 constitutes an axis of rotation for this turning movement.

As has been mentioned above, the locking spindle 16 is designed as a cylindrical tube. Running coaxially inside this tube there is another spindle in the form of a tilting spindle 20 which additionally can turn freely inside the locking spindle 16. As will be described in detail, the tilting spindle 20 is used for the tilting function in the arrangement according to the invention. As was stated in the introduction, this tilting function means that the vehicle's steering wheel, together with the inner steering wheel shaft 4, is pivoted upwards a certain distance so that the steering wheel is moved aside when the driver wishes to get into or out of the vehicle. This affords an advantage in terms of comfort since the driver is easily able to get into or out of the vehicle without bumping against the steering wheel.

The arrangement according to the invention further comprises a first disc-shaped adjustment washer 21 which is designed with two projecting pins 22, 23. The pins 22, 23 extend essentially parallel to the locking spindle 16 and are intended to project into two corresponding sets of holes 24, 25 through the third plate stack 12. Correspondingly, the invention includes a second adjustment washer 26 which is designed in the same way as the first adjustment washer 21 with a further two projecting pins 27, 28 which are intended to project into two corresponding sets of holes 29, 30 in the fourth plate stack 13.

The third plate stack 12 and the fourth plate stack 13 are thus intended to be mounted together with the respective adjustment washers 21, 26 which in turn are placed on both sides of the outer steering wheel shaft 1.

The arrangement which has been described above is intended to be mounted in the vehicle between two plate-like bracket parts, more precisely a first bracket part 31 and a second bracket part 32. The bracket parts 31, 32 are mounted securely in the vehicle, extending essentially parallel to the outer steering wheel shaft 1. The first bracket part 31 is designed with an opening 33 which is intended to receive the first adjustment washer 21. The opening 33 is elongate and extends essentially vertically. The rear side of the first adjustment washer 21; that is, the side facing towards the inside of the first bracket part 31, is also designed with a projecting portion 34, which is adapted to the opening 33 such that the width of the raised portion 34 is slightly less than the width of the opening 33. The height of the projecting portion 34 is also slightly greater than the thickness of the first bracket part 31.

The second bracket part 32 and the second adjustment washer 26 are designed in the same way as the first bracket part 31 and the first adjustment washer 21. That is, the second bracket part 32 is designed with an elongate opening 35 that is intended to receive the second adjustment washer 26. For this purpose, the second adjustment washer 26 is designed with a raised portion (not shown in the figure) which is directed towards the inside of the second bracket part 32. In this way, the two adjustment washers 21, 26 can be displaced upwards and downwards along each respective opening 33, 35. By contrast, the adjustment washers 21, 26 are locked against rotation by means of the fact that they are positioned in each respective opening 33, 35.

To permit the abovementioned tilting function of the invention, a first tilting washer 36 is provided which is designed as a disc or roller with a through-opening 37. Arranged across the opening 37 is a first slide bar 38 in the form of a pin. When this exemplary arrangement is in the assembled state, the slide bar 38 is arranged extending through a first hole 39 through the tilting spindle 20; and more precisely, at the end portion thereof. Correspondingly, a second tilting washer 40 is provided which is designed essentially in the same way as the first tilting washer 36; that is, with a through-opening 41 and a second slide bar 42. When the arrangement is in its assembled state, the second slide bar 42 is arranged extending through a further hole 43 through the opposite end portion of the tilting spindle 20.

The tilting washers 36, 40 are positioned on the outside of each respective bracket part 31, 32 and are intended to cooperate with each respective adjustment washer 26, 21 in the following manner. The first tilting washer 36 is provided with two curved projections 44 and 45 which are designed with internal threads and are directed towards the second adjustment washer 26. The second tilting washer 40 is designed in the same way; that is, with internally threaded projections (not shown in FIG. 1) which are directed towards the first adjustment washer 21.

As has been mentioned above, the first adjustment washer 21 includes a projecting portion 34. The design further includes an upper edge 47 and a lower edge 48 that are rounded and are provided with external threads intended to cooperate with the internally threaded projections (not shown in FIG. 1) on the first tilting washer 40.

The second adjustment washer 26 is also designed with a projecting, threaded portion (not shown in FIG. 1) of a corresponding design to the projecting portion 34 of the first adjustment washer 21. As will be explained in greater detail below, the internally threaded portions of each tilting washer 36, 40 are arranged so that they cooperate with the externally threaded portions of the respective adjustment washer 21, 26 for locking these components securely to the respective bracket part 31, 32.

The tilting spindle 20 can be turned freely inside the locking spindle 16. When the arrangement is in its assembled state, turning of the second tilting washer 40 results in the tilting spindle 20 being turned inside the locking spindle 16 while the second tilting washer 40 is screwed against the first adjustment washer 21. The threading and the dimensions of these cooperating components are adapted so that a relatively limited turning of the second tilting washer 40 results in the second tilting washer 40 and the first adjustment washer 21 being locked securely against the first bracket part 31. The threading between the first adjustment washer 21 and the second tilting washer 40 is designed in the opposite direction to the threading between the second adjustment washer 26 and the first tilting washer 36. For this reason, and because the first hole 39 through the tilting spindle 20 is made somewhat elongate, a locking of the first tilting washer 36 is also obtained and the second adjustment washer 26 is locked securely against the second bracket part 32 during this stage.

A basic principle behind the present invention is to provide an integrated adjusting and tilting function which is in particular intended to permit adjustment of the steering wheel and then locking of the steering wheel in the desired position, after which tilting is permitted. A set position of the steering wheel is thus maintained after the tilting function has been completed. For this purpose, an exemplary arrangement configured according to the present invention includes a cam lock 49, which in turn is made up of an inner washer 50 and an outer washer S1 between which a number of pins 52 are arranged. The pins 52 are preferably three in number. The washers 50, 51 are designed with through-holes via which the locking spindle 16 is intended to run when the arrangement is assembled. The washers 50, 51 are also intended to be turned in the opposite direction to each other in order to set the cam lock 49 either in a locked or an unlocked position. FIG. 1 shows the unlocked position, where the three pins 52 are slightly inclined in relation to the longitudinal direction of the locking spindle 16. If the washers 50, 51 are instead turned in the opposite direction to each other, the pins 52 can be set in a position in which they extend essentially parallel to the longitudinal direction of the locking spindle 16. This means that the axial distance between the washers 50, 51 increases somewhat compared to the unlocked position. As will be described in detail below, this function can be used for locking the different plate stacks 8, 9, 12, 13, thereby locking the vehicle's steering wheel in a desired position.

Figure 2:
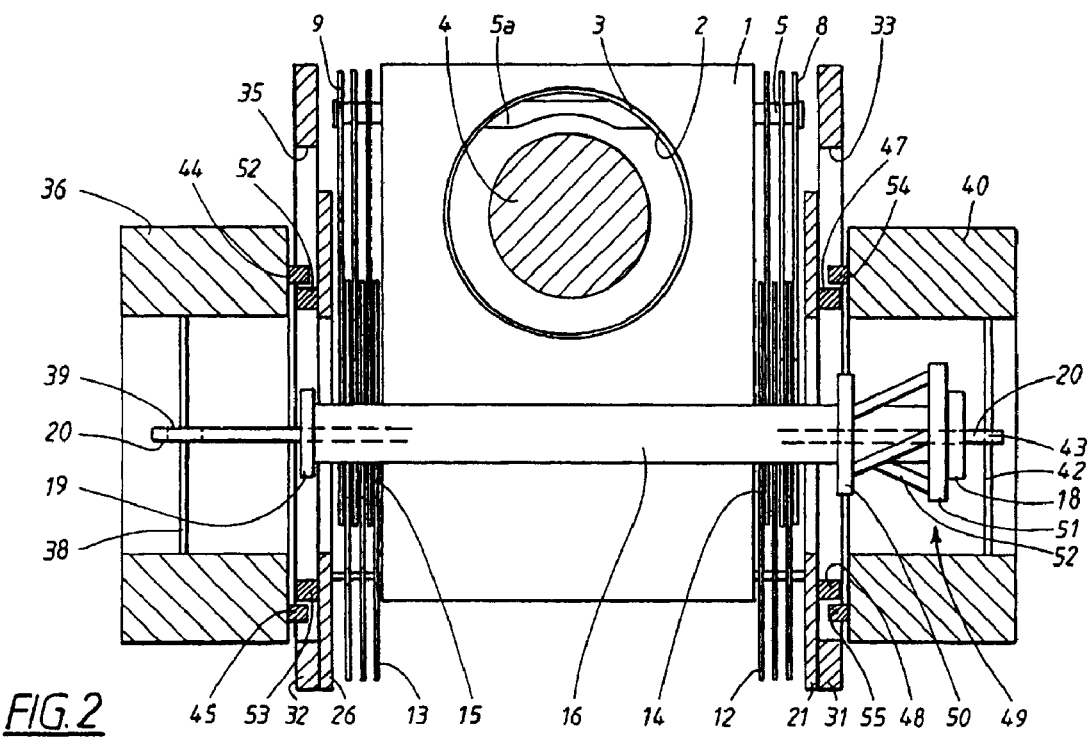
FIG. 2 shows a front elevational view of the arrangement according to the invention, in the assembled state.

The function of the invention will now be described in detail with reference to FIG. 2 which is a diagrammatic assembled front view, partially taken in cross section, of an illustrative arrangement configured according to the present invention. FIG. 2 shows the invention with the adjusting function unlocked. In the illustrated example, this means that the pins 52 in the cam lock 49 are inclined in relation to the longitudinal direction of the locking spindle 16. The figure also shows how the locking spindle 16 runs through the outer steering wheel shaft 1, the plate stacks 8, 9, 12, 13, the adjustment washers 21, 26 and the bracket parts 31, 32. In this position the cam lock 49 is also arranged on the locking spindle 16, between the first limit stop 18 and the first adjustment washer 21. For this purpose, the diameter of the washers 50, 51 included in the cam lock 49 is also slightly smaller than the width of the opening 33 in the first bracket part 31 (see FIG. 1). The tilting spindle 20 is also arranged such that it runs through the locking spindle 16, the respective slide bar 38, 42 of each respective tilting washer 36, 40 running through the abovementioned holes 39, 43 in the tilting spindle 20.

FIG. 2 also shows how the adjusting tube 3 is arranged extending through the outer steering wheel shaft 1. The inner steering wheel shaft 4 also runs through the adjusting tube 3. The articulation spindle 5 runs transversely through the upper part of the outer steering wheel shaft 1 and through the adjusting tube 3, as has been explained above. The articulation spindle 5 is designed with a central portion 5a whose underside is preferably partially cut away. In this way, the inner steering wheel shaft 4 is allowed to turn freely in the adjusting tube 3 without striking the central portion 5a.

When the adjusting function of the arrangement is in its unlocked state (which is the state shown in FIG. 2), the plate stacks 8, 9, 12, 13 are not locked together. In this position, the driver of the vehicle can thus move the steering wheel which is not shown, together with the inner steering wheel shaft 4 with respect to height and depth. A depth adjustment is made possible in the illustrative embodiment because the first plate stack 8 and second plate stack 9 may be pivoted in relation to the third plate stack 12 and fourth plate stack 13, respectively (see FIG. 1) while the articulation spindle 5 is moved along the outer steering wheel shaft 1. A height adjustment of the inner steering wheel shaft 4 and also the outer steering wheel shaft 1 is made possible by the fact that the locking spindle 16 can be moved along the elongate holes 14, 15 in the plate stacks 8, 9, 12, 13. During this movement, the tilting spindle 20 is displaced along the respective slide bar 38, 42, assuming that each tilting washer 36, 40 and each adjustment washer 21, 26 is locked securely to the respective bracket part 31, 32, assuming that the tilting function is locked.

When the driver has chosen the desired position of the steering wheel, this position can be fixed by means of the cam lock 49. For this purpose, the outer washer 51 is rotated in relation to the inner washer 50 until the pins 52 assume a state in which they are essentially parallel to the locking spindle 16. Since the distance between the two limit stops 18, 19 is constant, the inner washer 50 of the cam lock 49 is moved in the direction towards the first adjustment washer 21 such as to the left in FIG. 2. Since the inner washer 50 is positioned outside the first adjustment washer 21 and the second limit stop 19 is positioned outside the second adjustment washer 26, this maneuver results in the two adjustment washers 21, 26 being clamped securely against the plate stacks 8, 9, 12, 13, which are thus securely locked in the set position.

To loosen the plate stacks 8, 9, 12, 13, the outer washer 51 is turned in relation to the inner washer 50 back to the position shown in FIG. 2; that is, so that the pins 52 are once again inclined. In this way, the position of the steering wheel can be adjusted again and set to a new position if so desired.

To access the cam lock 49, such as for the purpose of turning the outer washer 51, the second tilting washer 40 is preferably designed with a recess (not shown) or the like to which an activating means (not shown), for example a column, is connected. In this way, the driver of the vehicle can mechanically release and lock the plate stacks 8, 9, 12, 13 in the manner described above. Alternatively, this function can be remote-controlled, for example by means of an electric switch (not shown) which is connected to a motor which in turn is used for locking and unlocking the cam lock 49. The switch can be activated by the driver of the vehicle in order to adjust or lock the position of the steering wheel.

A basic principle behind the present invention is also to provide the above described tilting function, in which a position locked by means of the cam lock 49 can be maintained while the tilting function is activated. This function will now be described in detail.

FIG. 2 shows the arrangement in the lower end position; that is, the locking spindle 16 is positioned relatively far down in the openings 33, 35 in the first bracket part 31 and second bracket part 32, respectively. The tilting function is additionally locked, which means that the threaded connection between the projections 44, 45 on the first tilting washer 36 and the corresponding threaded surfaces 52, 53 of the second adjustment washer 26 and the threaded connection between the threaded surfaces 47, 48 of the first adjustment washer and the corresponding projections 54, 55 on the second tilting washer 40 are tightened. The tilting washers 36, 40 and the adjustment washers 21, 26 are locked securely to each other and to the respective bracket parts 31, 32.

It should be noted that even when the tilting washers 36, 40 are locked securely against the respective bracket part 31, 32 as shown in FIG. 2, it is still possible to raise and lower the locking spindle 16 as long as the cam lock 49 is in its open position. The adjusting function of the arrangement is thus independent of the tilting function.

The tilting function in the invention can be activated, for example, when the driver wishes to get out of the vehicle. This activation is made possible by turning the second tilting washer 40 in a predetermined direction (typically determined by the direction of the respective threads), as a result of which the two abovementioned threaded connections are released. As has been explained above, this assumes that the two threaded connections are threaded in opposite directions. Thus, the tilting washers 36, 40 are then released from the adjustment washers 26, 21 and the brackets parts 32, 31. The whole of the outer steering wheel shaft 1 with the locking spindle 16 is now allowed to move along the two grooves 33, 35 in the respective bracket part 31, 32. The arrangement can then adopt, for example, an upper end position in which the locking spindle 16 is positioned as far up in the vertical direction as is permitted by the height of the openings 33, 35 in the respective bracket part 31, 32. This makes it easier for the driver to get out of the vehicle.

Conversely, the arrangement can be moved from the upper end position to the lower end position after the driver has gotten into the vehicle and is ready to drive the vehicle. When the driver has sat down in the driver's seat in order to start up the vehicle engine, the outer steering wheel shaft 1 can then be moved down again to the lower end position. The tilting function is then locked by turning the second tilting washer 40 so that the arrangement once again assumes the locked state shown in FIG. 2.

The tilting washers 36, 40 are preferably designed so that the slide bars 38, 42 are oriented essentially vertically when the tilting function is in its locked state. In this way, the tilting spindle 20 is allowed to run along the slide bars 38, 42 during adjustment of the steering wheel position.

The tilting function is preferably activated automatically, for example by means of signals from the vehicle's ignition lock or door lock, or alternatively by means of switches in the driver's seat, which preferably in turn activate means (not shown) for rotating the second tilting washer 40. For example, the invention can be such that when the driver turns the ignition key to the position in which the engine is switched off, an electric motor (not shown) is activated, which is in turn designed to activate the tilting function by rotating the tilting washer 40. In this way, the inner steering wheel shaft 4 can be moved to an upper end position. When the inner steering wheel shaft 4 has reached this upper position, a position sensor (not shown) gives the electric motor a signal for locking the tilting function. When the driver once again sits down in the vehicle, the electric motor can be activated when the ignition key is turned to the position in which the engine is started up. In this way, the tilting function is activated again, and the inner steering wheel shaft 4 is moved down to its lower end position. By means of a signal from the position sensor, the inner steering wheel shaft 4 can then be locked in this lower position.

The invention is not limited to an automatically activated tilting function, but can in principle also be made completely manual by rotation of the tilting washer 40.

Thus, according to the invention, a first lock arrangement is formed by the plate stacks 8, 9, 12, 13, the adjustment washers 21, 26 and the cam lock 49. This lock arrangement is used for the adjusting function of the invention, where the driver of the vehicle is able to set the steering wheel to a desired position. The cam lock 49 is used here to lock the plate stacks 8, 9, 12, 13 in relation to each other. This means that the locking spindle 16 is locked in relation to the articulation spindle 5. A second lock arrangement is also formed by the tilting spindle 20, the adjustment washers 21, 26 and the tilting washers 36, 40, by means of which the tilting function can be activated, where a steering wheel position which has been set and locked using the adjusting function is also maintained while the tilting function is activated.

The invention is not limited to the embodiment described above, but can be varied within the scope of the attached claims. For example, the bracket parts 31, 32 can be designed with beveled or sunken grooves in order to clearly define the upper end position and the lower end position for the tilting function. Moreover, the plate stacks 8, 9, 12, 13, the locking spindle 16 and the tilting spindle 20 may exemplarily vary in design and dimension, depending on the application. Similarly, types of locks other than the cam lock 49 described above can be used for locking the plates. Still further, the invention can be used on various types of vehicles, for example passenger cars, lorries, buses and the like.

What is claimed is:

1. An arrangement for an adjustable steering mechanism in a vehicle, comprising a steering wheel which is fixed to an inner steering wheel shaft which in turn is arranged to be adjustable as regards height and depth, a first lock arrangement intended to fix the inner steering wheel shaft in a chosen position as regards height and depth, and a second lock arrangement intended to set the steering wheel in at least two distinct vertical positions independently of any locking of the first lock arrangement, the first lock arrangement is supported on a locking spindle extending essentially transverse to the longitudinal direction of the inner steering wheel shaft and connected to the inner steering wheel shaft, and the second lock arrangement comprises a rotatable tilting spindle extending coaxially through the locking spindle.

2. The arrangement according to claim 1, wherein the inner steering wheel shaft is suspended displaceably in an outer steering wheel-shaft, through which the locking spindle is arranged.

3. The arrangement according to claim 1, wherein the first lock arrangement comprises at least one set of plates which are supported on the locking spindle and which are intended to be pressed together for locking the position of the inner steering wheel shaft.

4. The arrangement according to claim 3, further comprising a mechanically actuated cam lock which is arranged coaxially about the locking spindle for pressing together and locking the plates.

5. The arrangement according to claim 1, wherein the locking spindle is arranged to extend through two bracket parts which are arranged on both sides of the inner steering wheel shaft and fixed to the vehicle.

6. The arrangement according to claim 5, wherein each bracket part comprises an elongate groove intended to permit displacement of the inner steering wheel shaft in essentially the vertical direction.

7. The arrangement according to claim 5, wherein the second lock arrangement comprises at least one rotatable tilting washer which is supported by the tilting spindle and which is intended to be fixed in two distinct positions in the bracket parts.

8. The arrangement according to claim 7, wherein the tilting washer is locked by cooperation with an adjustment washer, at least one of parts the bracket being locked between the tilting washer and the adjustment washer.

9. An adjustable steering arrangement for a driver of a vehicle, the arrangement comprising:

an inner steering wheel shaft adapted to be connected to a steering wheel, the inner steering wheel shaft being arranged to be vertically adjustable and telescopically adjustable with respect to distance from the driver;

a first lock arrangement configured to fix the inner steering wheel shaft in a chosen position with respect to vertical and distance from the driver;

a second lock arrangement configured to fix the steering wheel in at least two distinct vertical positions independent of any locking of the first lock arrangement;

the first lock arrangement being supported on a locking spindle extending transversely to a longitudinal direction of the inner steering wheel shaft and being connected to the inner steering wheel shaft; and the second lock arrangement comprises a rotatable tilting spindle extending coaxially through the locking spindle.

10. The adjustable steering arrangement according to claim 9, further comprising:

the inner steering wheel shaft being moveably suspended in an outer steering wheel-shaft through which the locking spindle is arranged.

11. The adjustable steering arrangement according to claim 9, further comprising:

the first lock arrangement having at least one set of plates supported on the locking spindle and which are configured to be pressed together to lock the position of the inner steering wheel shaft.

12. The adjustable steering arrangement according to claim 11, further comprising:

a mechanically actuated cam lock arranged coaxially about the locking spindle and configured to press together and lock the plates.

13. The adjustable steering arrangement according to claim 9, further comprising:

the locking spindle extending through two bracket parts arranged on both sides of the inner steering wheel shaft and fixed to the vehicle.

14. The adjustable steering arrangement according to claim 13, further comprising:

each bracket part having an elongate groove configured to permit displacement of the inner steering wheel shaft in the vertical direction.

15. The adjustable steering arrangement according to claim 13, further comprising:

the second lock arrangement having at least one rotatable tilting washer supported by the tilting spindle and which is configured to be fixed in two distinct positions in the bracket parts.

16. The adjustable steering arrangement according to claim 15, further comprising:

the tilting washer being locked by cooperation with an adjustment washer; and at least one of the bracket parts being locked between the tilting washer and the adjustment washer.

* * * * *